United States Patent [19]

Tabana et al.

[11] 4,075,285

[45] Feb. 21, 1978

[54] RUBBER-MODIFIED POLYSTYRENE RESIN COMPOSITION

[75] Inventors: Minoru Tabana, Suita; Shizuo Narisawa, Ichihara; Tatsuyuki Mitsuno, Toyonaka; Hiroshi Maki, Takatsuki, all of Japan

[73] Assignee: Sumitomo Chemical Company, Limited, osaka, Japan

[21] Appl. No.: 554,524

[22] Filed: Mar. 3, 1975

[30] Foreign Application Priority Data

Mar. 9, 1974 Japan .................................. 49-27405

[51] Int. Cl.$^2$ .............................................. C08L 53/02
[52] U.S. Cl. ............................... 260/876 B; 260/880 B
[58] Field of Search ............. 260/876 B, 876 R, 880 B

[56] References Cited

U.S. PATENT DOCUMENTS

| | | | |
|---|---|---|---|
| 3,562,204 | 2/1971 | Van Breen | 260/876 B |
| 3,835,200 | 9/1974 | Lee, Jr. | 260/876 B |
| 3,853,978 | 12/1974 | Horiie et al. | 260/880 B X |
| 3,873,645 | 3/1975 | Muirhead et al. | 260/879 |
| 3,906,057 | 9/1975 | Durst | 260/876 B |
| 3,907,930 | 9/1975 | O'Grady | 260/876 B |

FOREIGN PATENT DOCUMENTS

| | | | |
|---|---|---|---|
| 1,471,458 | 1/1967 | France. | |
| 1,493,846 | 7/1967 | France. | |
| 2,037,432 | 12/1970 | France. | |
| 4,734,808 | 1972 | Japan. | |
| 1,145,923 | 3/1969 | United Kingdom | 260/876 B |

*Primary Examiner*—Murray Tillman
*Assistant Examiner*—Thurman K. Page
*Attorney, Agent, or Firm*—Stevens, Davis, Miller & Mosher

[57] ABSTRACT

A rubber-modified polystyrene resin composition consisting essentially of a rubber-modified polystyrene and a transparent, resinous styrene-butadiene block copolymer containing 65 to 95% by weight of styrene and 5 to 35% by weight of butadiene. This resin composition is excellent in impact strength, elongation, flexural stress clouding, hinging endurance, and surface gloss.

4 Claims, No Drawings

RUBBER-MODIFIED POLYSTYRENE RESIN COMPOSITION

This invention relates to a rubber-modified polystyrene resin composition. More particularly, it relates to a rubber-modified polystyrene resin composition consisting essentially of a rubber-modified polystyrene and a transparent, resinous styrene-butadiene block copolymer, which composition is excellent particularly in impact strength and elongation, good in stiffness and heat resistance, less susceptible to flexural stress clouding, and improved in hinging endurance and surface gloss.

Among the attempts made heretofore to improve the toughness of polystyrene, those which have proved to be a measure of success are (1) a method in which polystyrene is mechanically blended with a rubbery substance to prepare a rubber-modified polystyrene of the so-called blend type, (2) a method wherein styrene containing a dissolved rubbery substance is polymerized to form a rubber-modified polystyrene of the so-called graft type, and (3) a method whereby a transparent block copolymer resin with sufficient toughness is produced from styrene and butadiene (the resin produced by this method is hereinafter referred to as styrene-butadiene block copolymer resin).

However, when articles of intricate design or deep-drawn articles are manufactured by injection molding, blow molding, or vacuum forming to meet recent diversified demands, the rubber-modified polystyrenes of the blend type and graft type cause troubles on account of insufficient toughness, though the degree depends upon the process of manufacturing the rubber-modified polystyrenes themselves, such as occurrence of clouding or cracks in the articles due to the stress developed in releasing them from the mold, and breakage due to the impact when they are dropped, and other troubles originated from the rubbery substance used in manufacturing the rubber-modified polystyrenes, such as reduction in surface gloss, resulting in markedly decreased commerical value of the fabricated articles. The styrene-butadiene block copolymer resin, on the other hand, has found limited use except in sheeting and film, because of more or less insufficient impact strength, stiffness, surface hardness, and thermal resistance, though the resin is desirable in elongation and hinging endurance, without being subject to flexural stress clouding.

The present inventors have now found that by combining a rubber-modified polystyrene and a styrene-butadiene block copolymer resin into a composition to integrate advantages of both polymers, it is possible to obtain a resin composition which is excellent in mechanical properties, particularly in impact strength and elongation, favorable in stiffness and thermal resistance, and improved in resistance to flexural stress clouding, in hinging endurance, and in surface gloss.

An object of this invention is to provide a novel resin composition improved in various physical properties, consisting essentially of a rubber-modified polystyrene and a styrene-butadiene block copolymer.

Other objects and advantages of this invention will become apparent from the following description.

The above-said resin composition having excellent mechanical properties, particularly excellent impact strength and elongation, favorable stiffness and thermal resistance, and improved resistance to flexural stress clouding, hinging endurance, and surface gloss can be obtained by mechanically mixing a rubber-modified polystyrene containing an incorporated rubbery substance and a transparent, resinous styrene-butadiene block copolymer containing 65 to 95% by weight of styrene and 5 to 35% by weight of butadiene. A detailed explanation of these characteristics in relation to the mixing ratio between the rubber-modified polystyrene and the styrene-butadiene block copolymer resin is given below.

When the ratio of the modified polystyrene to the styrene-butadiene block copolymer resin is in the range from about 0.5 : 99.5 to about 15 : 85 by weight, the composition retains such a favorable elongation, resistance to flexural stress clouding, and hinging endurance that are characteristic of the styrene-butadiene block copolymer resin and, in addition, is imparted with sufficient stiffness, thermal resistance, and mechanical strengths for use in, for example, ice-cream containers or trays under actual service conditions. In the range where the said ratio is from about 15 : 85 to about 99.5 : 0.5 by weight, the composition is excellent in impact strength and elongation and favorable in hinging endurance and surface gloss with reduced susceptibility to flexural stress clouding. Particularly, when the said ratio is in the range from about 40 : 60 to about 70 : 30 by weight, there is obtained a composition which is improved in impact strength to a level reaching that of a so-called super high impact resistance so that the fabricated article is unbreakable under severe impact and which has, moreover, an excellent hinging endurance, to allow the composition to be used in a wide range of articles where toughness is required. Further, in the range where the said ratio is from about 70 : 30 to 98 : 2 by weight, as compared with a resin composition comprising a styrene-butadiene block copolymer with a higher butadiene content and a rubber-modified polystyrene [Japanese Patent Application Laid-open ("Kokai") No. 56,250/73; British Pat. No. 1,077,769], the present composition is superior in impact strength and hinging endurance with less reduction in stiffness, thermal resistance, and surface hardness, thus retaining sufficiently well-balanced physical properties for actual service, and has sufficient toughness to prevent the fabricated articles from stress clouding and cracks which are apt to occur with a rubber-modified polystyrene in releasing an intricately designed article or a deep-drawn article from its mold after having been shaped by injection molding, blow-molding, or vacuum forming.

Moreover, beside the above-noted performance characteristics, the present resin composition has superior surface gloss and transparency than those of a common mixture of a polystyrene and a rubber-modified polystyrene and an advantage of better transparency over a mixture of a styrene-butadiene block copolymer with high butadiene content and a rubber-modified polystyrene.

As mentioned above, the present resin composition comprising a rubber-modified polystyrene and a styrene-butadiene block copolymer manifests characteristic features corresponding to the respective component ratios and, accordingly, can be used in a broad field.

The rubber-modified polystyrene as herein referred to includes a composition obtained by mechanically mixing a rubbery substance (for example, polybutadiene rubber, styrene-butadiene copolymer rubber, etc.) with polystyrene and a styrene-rubbery substance graft copolymer produced by customary graft copolymerization of styrene containing the above-noted rubbery substance dissolved therein, such as bulk, suspension, or bulk-suspension two-stage copolymerization.

Structure of the styrene-butadiene block copolymer resin used in the present invention may be represented by the following model formulas:

1. $(S-B)_n$, $(S-B)_n-S$, or $B-(S-B)_n$,
2. $[S-(S/B)]_n$, $[S-(S/B)]_n-S$, or $(S/B)-[S-(S/B)]_n$,
3. $[(B \rightarrow S)]_n-S$, $S-[(B \rightarrow S)]_n$, $S-[(B \rightarrow S)]_n-S$, or $S-[(S \leftarrow B \rightarrow S)]_n-S$, or
4. $S-[(S/B) \rightarrow (S/B)]-S$ or $S-[(S/B) \leftarrow (S/B) \rightarrow (S/B)]-S$, wherein S represents a block chain comprising polymerized styrene, B represents an elastomeric block chain comprising polymerized butadiene, (S/B) represents an elastomeric block chain comprising copolymerized styrene and butadiene, in which chain styrene and butadiene are bound to each other in a fixed ratio [the ratio of S to B in (S/B) can be any of the ratios including the case where S is absent], $(B \rightarrow S)$ or $(S \leftarrow B \rightarrow S)$ represents an elastomeric block chain comprising copolymerized styrene and butadiene, in which chain in the direction denoted by an arrow butadiene content gradually decreases while styrene content increases, $[(S/B) \rightarrow (S/B)]$ or $[(S/B) \leftarrow (S/B) \rightarrow (S/B)]$ represents an elastomeric block chain comprising a styrene-butadiene copolymer chain in which styrene and butadiene are bound in a random ratio and the ratio varies within the block chain intermittently or continuously, and $n$ is an integer of preferably 1 to 3.

These styrene-butadiene block copolymer resins can be prepared by means of a living polymerization technique.

The styrene-butadiene block copolymers resins (1), (2), and (4) can be prepared, for example, according to a block copolymerization method proposed in Japanese Patent Publication No. 19,286/61 by stepwise polymerization of styrene or butadiene or a mixture of styrene and butadiene in a hydrocarbon solvent by use of an organolithium compound as initiator. In the step of forming the block chain (S/B) comprising a styrene-butadiene copolymer, a styrene-butadiene mixture is added all at a time, or portion-wise, or continuously to the polymerization mixture in the presence of a small amount of a polar compound such as an ether compound or a tertiary amine compound to copolymerize styrene and butadiene.

The styrene-butadiene block copolymer resin (3) can be obtained, for example, according to the method disclosed in Japanese Patent Application Laid-open ("Kokai") No. 7,597/71, Japanese Patent Publication No. 2,423/73, Japanese Patent Application Laid-open ("Kokai") No. 39,389/72, Japanese Patent Publication No. 20,038/73, or Japanese Patent Publication No. 11,090/64 or a method derived from them by adding a mixture of styrene and butadiene all at a time to the polymerization system in a hydrocarbon solvent by use of an organolithium compound as initiator in the presence or absence of a small amount of a polar compound to effect copolymerization. When an organomonolithium compound is used as initiator, a styrene-butadiene copolymer chain of the $(B \rightarrow S)$ type is obtained, and when an organodilithium compound is used, the $(S \leftarrow B \rightarrow S)$ type is obtained, the butadiene/styrene ratio varying gradually within the chains of both types.

The styrene-butadiene copolymer resin (4) can be formed, for example, in a hydrocarbon solvent by use of an organolithium compound as initiator in the presence of a small amount of an ether compound or a tertiary amine compound, by adding styrene and butadiene to the polymerization system in such a manner that the styrene/butadiene ratio may randomly vary intermittently or continuously, resulting in a copolymer. Thereafter the chain S is formed by further adding styrene to the polymerization system to continue the polymerization.

Examples are $S-B-(S/B)-S$, $S-(S/B)-B-(S/B)-S$, $S-(S/B)-(S/B)-S$, $S-(S/B)-(S/B)-(S/B)-S$, etc.

The transparent styrene-butadiene block copolymer resin for use in the present composition contains 5 to 35% by weight of butadiene. If the butadiene content is below 5% by weight, the styrene-butadiene block copolymer becomes lacking in toughness, while when it exceeds 35% by weight, the styrene-butadiene block copolymer resin becomes rubbery. If such a rubbery compolymer resin of high butadiene content is used, with the increase in its amount, the resin composition loses more and more in stiffness, thermal resistance, and surface gloss, resulting in the decrease in practical value as can be seen from, for example, the aforesaid Japanese Patent Application Laid-open ("Kokai") No. 56,250/73 and British Pat. No. 1,077,969.

For the embodiment of the present invention, an elastomeric block chain comprising a styrene-butadiene copolymer block is preferred to that composed of homopolymerized butadiene alone in the styrene-butadiene block copolymer.

Preparation of the present composition by mixing in molten state can be carried out, for example, by means of an extruder, mixing rolls, Banbury mixer, or the like, though the mixing method is subject to no particular restriction. The resin composition can also be incorporated with common additives such as, for example, stabilizers, colorants, and lubricants.

The invention is illustrated below in detail with reference to Referential Examples and Examples.

Referential Example

Preparation of the rubber-modified polystyrene and styrene-butadiene block copolymer was carried out in the following way.

Preparation of rubber-modified polystyrene

Into a reactor, were charged 5 kg of styrene, 325 g of polybutadiene (Diene NF-35A of Asahi Chemical Industry Co.; molecular weight, 200,000; cis-1,4 content 35%), 5 g of tert-dodecyl mercaptan, and 350 g of mineral oil. The charge in the reactor was allowed to polymerize at 120° C for 3 hours. The resulting prepolymer was dispersed in a suspending medium comprising 5 liters of water, 10 g of tricalcium phosphate, and 0.05 g of sodium dodecylbenzenesulfonate. After addition of 17.5 g of dibenzoyl peroxide and 10 g of tertbutyl perbenzoate, the dispersion was heated at 30° to 40° for 1 hour, at 92° C for 3 hours, at 92° to 135° C for 1.5 hours, and at 135° C for 1 hour. After the reaction is completed, the resulting polymer was collected by filtration, washed, and dried to recover a purified polymer which had a melt index (in compliance with JIS K 6760) of 2.0 g/10 minutes, as measured at 190° C under a load of 2.16 kg.

Preparation of styrene-butadiene block copolymer (A)

Into a 25-liter autoclave provided with a stirrer and a jacket, after the air the in which had been replaced with nitrogen, were added 15 liters of benzene as solvent, 1.5 kg of styrene, 9.0 g of tetrahydrofuran, and a n-hexane solution containing 75 ml of n-butyllithium as initiator. Polymerization was allowed to proceed at 60° C for 1.5 hours. To the polymerization system, was added a mixture of 1.0 kg of styrene and 1.0 kg of butadiene as the second stage monomers and the polymerization was continued at 60° C for 3 hours. To the polymerization system, was added 1.5 kg of styrene as the third stage monomer to continue the polymerization for further 1.5 hours. Polymerization was terminated by addition of 50 ml of methanol as terminating agent.

The resulting viscous polymerizate solution was mixed with a large volume of methanol with vigorous stirring to precipitate a polymer which was filtered and dried under reduced pressure.

The yield of the polymer was substantially 100%. The polymer had an intrinsic viscosity of 0.71 dl/g as measured in toluene at 30° C, a butadiene content of 20% by weight, and a melt index of 0.6 g/10 minutes.

Preparation of styrene-butadiene copolymer resin (B)

Polymerization was carried out in the same manner as in the preparation of the copolymer (A), except that there were used 1.25 kg of styrene as the first stage monomer, a mixture of 1.25 kg of styrene and 1.25 kg of butadiene as the second stage monomer, and 1.25 kg of styrene as the third stage monomer. There was obtained a polymer having an intrinsic viscosity of 0.74 dl/g, a butadiene content of 25% by weight, and a melt index of 0.5 g/10 minutes.

Preparation of styrene-butadiene block copolymer (C)

In a manner similar to that mentioned above, polymerization was started using a mixture of 15 liters of dry cyclohexane as solvent, 1.50 kg of styrene, 9.0 g of tetrahydrofuran, and a benzene solution containing 75 millimoles of n-butyllithium as initiator. After 1.5 hours of polymerization at 60° C., to the polymerization system was added the second-step monomer mixture of 375 g of styrene and 375 g of butadiene continuously at a constant rate over a period of 1 hour, and thereafter stirred for 30 minutes. After addition of 500 g of butadiene, the third-step monomer, polymerization was continued for one hour. To the polymerization system was added the fourth-step monomer mixture of 375 g of styrene and 375 g of butadiene continuously at a constant rate over a period of one hour and thereafter stirred for 30 minutes. After final addition of 1.50 kg of styrene, the fifth-step monomer, polymerization was continued for 1.5 hours at 60° C. Polymerization was then terminated by adding 50 ml of methanol as polymerization stopper and 50 g of Sumilizer BHT as an antioxidant (registered trademark of 3,5-di-tert.butyl-4-hydroxytoluene, manufactured by Sumitomo Chemical Co.). The resulting viscous polymerizate solution was mixed with a large volume of methanol with vigorous stirring to precipitate a polymer which was collected by filtration and dried in vacuo. The polymer, which was obtained in a yield of substantially 100%, showed an intrinsic viscosity of 0.74 dl/g, as measured in toluene at 30° C., a butadiene content of 25% by weight, and a melt index (in accordance with JIS K 6760) of 0.30 g/10 minutes, as measured at 190° C. under a load of 2.16 kg.

EXAMPLE 1

Predetermined amounts of pellets of the rubber-modified polystyrene and styrene-butadiene block copolymer (A), which had been obtained in Referential Example, were milled by means of a 6-inch mixing-roll at a surface temperature of 150° C for 7 minutes. The resulting resin composition was compression-molded by means of a press to prepare specified test specimens. Physical properties of the composition were as summarized in Table 1.

Table 1

| No. | Rubber-modified polystyrene (%) | Styrene butadiene block copolymer resin(A) (%) | Tensile strength (kg/cm$^2$) | Elongation (%) | Izod impart strength, notched (kg·cm/cm$^2$) | Stiffness in flexure (kg/cm$^2$) | Vicat softening point (° C) | Surface hardness Rockwell M-scale (a) | Surface gloss (%) (b) | Flexural stress clouding | Hinging endurance (Number of foldings) (c) |
|---|---|---|---|---|---|---|---|---|---|---|---|
| 1 | 0 | 100 | 230 | 220 | 2.3 | 15,800 | 65 | 28 | — | No | 89,000 |
| 2 | 0.5 | 99.5 | 217 | 212 | 2.3 | 15,900 | 65 | 28 | — | No | 88,000 |
| 3 | 15 | 85 | 210 | 195 | 7.8 | 16,200 | 68 | 30 | 97 | No | 75,200 |
| 4 | 40 | 60 | 193 | 123 | 11.6 | 17,000 | 71 | 33 | 91 | A little | 15,200 |
| 5 | 60 | 40 | 187 | 72 | 11.9 | 18,100 | 73 | 37 | 84 | A little | 7,100 |
| 6 | 70 | 30 | 185 | 59 | 10.7 | 18,900 | 74 | 39 | 78 | A little | 2,500 |
| 7 | 98 | 2 | 191 | 41 | 7.9 | 20,800 | 77 | 41 | 41 | Yes | 92 |
| 8 | 99.5 | 0.5 | 190 | 38 | 7.7 | 21,300 | 77 | 43 | 40 | Yes | 52 |
| 9 | 10 | 0 | 195 | 38 | 7.7 | 21,500 | 78 | 44 | 38 | Yes | 46 |

Note:
(a) ASTM D 785-51, Rockwell hardness, M-scale.
(b) JIS Z 8741, Murakami Shikisai Gijutsu Kenkyusiho Type GM-5 glossmeter; 45-degree specular gloss.
(c) JIS P 8115, Toyo Seiki Co. Folding endurance meter; tensile load 1.0 kg, 175 foldings per minute.

As is evident from Table 1, in the range where the ratio of the rubber-modified polystyrene to the styrene-butadiene copolymer resin is from 0.5 : 99.5 to 15 : 85, the resin composition has well-balanced physical properties, being improved in impact strength, stiffness, and thermal resistance without losing favorable properties characteristic of the styrene-butadiene block copolymer resin, such as good elongation, good resistance to flexural stress clouding, and excellent hinging endurance. In the range where the said ratio is from 15 : 85 to 99.5 : 0.5, the resin composition has excellent elongation, fair resistance to flexural stress clouding, and good hinging endurance and surface gloss; particularly in the range from 40 : 60 to 70 : 30, the impact resistance is markedly improved. In the range where the said ratio is from 70 : 30 to 98 : 2, the resin composition showed improvement in impact strength and hinging endurance, indicating toughness of the resin composition, without significant decrease in stiffness, thermal resistance, and surface hardness characteristic of the rubber-modified polystyrene.

EXAMPLE 2

Experiments were carried out in the same manner as in Example 1, except that pellets of the styrene-butadiene block copolymer resin (B) were used. The results obtained were as shown in Table 2.

styrene-butadiene block copolymer of a butadiene content of 60% by weight and having a melt index (ASTM Table 2

| No. | Rubber-modified polystyrene (%) | Styrene-butadiene block copolymer resin (%) | Tensile strength (kg/cm$^2$) | Elongation (%) | Izod impact strength, notched (kg·cm/cm) | Stiffness in flexure (kg/cm$^2$) | Vicat softening point (° C) | Surface hardness Rockwell M-scale | Surface gloss (%) | Flexural stress clouding | Hinging endurance (Number of folding) |
|---|---|---|---|---|---|---|---|---|---|---|---|
| 10 | 0 | 100 | 185 | 300 | 2.6 | 8,900 | 54 | 24 | — | No | >100,000 |
| 11 | 0.5 | 99.5 | 183 | 300 | 2.7 | 8,700 | 54 | 24 | — | No | >100,000 |
| 12 | 15 | 85 | 202 | 273 | 9.7 | 9,300 | 58 | 27 | 98 | No | 95,300 |
| 13 | 40 | 60 | 185 | 154 | 20.1 | 12,900 | 63 | 30 | 93 | A little | 30,300 |
| 14 | 60 | 40 | 175 | 100 | 22.3 | 15,100 | 69 | 35 | 84 | A little | 11,100 |
| 15 | 70 | 30 | 170 | 70 | 19.1 | 16,500 | 71 | 38 | 77 | A little | 3,800 |
| 16 | 98 | 2 | 180 | 42 | 7.9 | 20,200 | 77 | 42 | 41 | Yes | 120 |
| 17 | 99.5 | 0.5 | 187 | 39 | 7.7 | 20,900 | 77 | 44 | 38 | Yes | 61 |
| 9 | 100 | 0 | 195 | 38 | 7.7 | 21,500 | 78 | 44 | 38 | Yes | 46 |

As is apparent from Table 2, characteristic properties of the resin composition relative to the ratio of the rubber-modified polystyrene to the styrene-butadiene block copolymer resin are similar to those in Example 1.

D 1238; 190° C, 2.16 kg load) of 2.6 was used. The results obtained were as shown in Table 4.

Table 4

| | No. | Rubber-modified polystyrene (%) | Styrene-butadiene block copolymer (%) | Tensile strength (kg/cm$^2$) | Izod impact strength, notched kg·cm/cm | Stiffness in flexure (kg/cm$^2$) | Vicat softening point (° C) | Surface hardness, Rockwell M-scale |
|---|---|---|---|---|---|---|---|---|
| Composition of this invention (Ex. 2) | 9 | 100 | 0 | 195 | 7.7 | 21,500 | 78 | 44 |
| | 26 | 95 | 5 | 178 | 8.4 | 18,500 | 77 | 42 |
| | 27 | 90 | 10 | 173 | 9.2 | 18,100 | 75 | 41 |
| | 28 | 80 | 20 | 177 | 13.9 | 17,300 | 73 | 40 |
| | 15 | 70 | 30 | 170 | 19.1 | 16,500 | 71 | 38 |
| | 29 | 50 | 50 | 176 | 24.3 | 14,000 | 66 | 32 |
| Comparative Ex. 1 | 30 | 95 | 5 | 177 | 9.0 | 18,300 | 76 | 37 |
| | 31 | 90 | 10 | 163 | 9.4 | 16,300 | 73 | 34 |
| | 32 | 80 | 20 | 140 | 10.3 | 12,000 | 67 | 30 |
| | 33 | 70 | 30 | 122 | 28.3 | 8,100 | 60 | 25 |
| | 34 | 50 | 50 | 115 | No rupture | Not measurable *1 | Not measurable *2 | 20 |

Note:
* 1 Data were unobtainable from the chart.
* 2 In setting the tester, the specified penetration of 1 mm was attained.

EXAMPLE 3

The same experiments as in Example 1 were repeated, except that the pelletized styrene-butadiene block copolymer (C) obtained in Referential Example was used. The results obtained were as summarized in Table 3.

As is apparent from Table 4, in the range where proportions of the incorporated styrene-butadiene block copolymer are kept low, the present resin compositions showed an impact strength comparable to that of the resin compositions of Comparative Example and superior stiffness, thermal resistance, and surface hardness to those of the latter, indicating more favorably balanced physical properties.

Table 3

| No. | Rubber-modified polystyrene (%) | Styrene-butadiene block copolymer resin(C) (%) | Tensile strength (kg/cm$^2$) | Elongation (%) | Izod impact strength, notched (kg·cm/cm) | Stiffness in flexure (kg·cm$^2$) | Vicat softening point (20 C) | Surface hardness Rockwell M-scale | Surface gloss (%) | Flexural stress clouding | Hinging endurance (Number of foldings) |
|---|---|---|---|---|---|---|---|---|---|---|---|
| 18 | 0 | 100 | 210 | 350 | 1.8 | 12,400 | 59 | 34 | — | No | 3,270 |
| 19 | 0.5 | 99.5 | 202 | 330 | 2.0 | 12,500 | 59 | 34 | — | No | 3,350 |
| 20 | 15 | 85 | 190 | 213 | 8.0 | 13,000 | 63 | 36 | 99 | No | 3,980 |
| 21 | 40 | 60 | 195 | 95 | 16.8 | 14,300 | 70 | 38 | 94 | A little | 3,500 |
| 22 | 60 | 40 | 186 | 75 | 18.2 | 17,000 | 73 | 39 | 86 | A little | 2,790 |
| 23 | 70 | 30 | 185 | 62 | 16.4 | 18,200 | 75 | 40 | 79 | A little | 1,640 |
| 24 | 98 | 2 | 191 | 41 | 8.2 | 20,500 | 77 | 42 | 44 | Yes | 78 |
| 25 | 99.5 | 0.5 | 197 | 39 | 7.8 | 21,200 | 78 | 44 | 39 | Yes | 49 |
| 9 | 100 | 0 | 195 | 38 | 7.7 | 21,500 | 78 | 44 | 38 | Yes | 46 |

As is apparent from Table 3, characteristic properties of the resin composition relative to the ratio of the rubber-modified polystyrene to the styrene-butadiene block copolymer resin are similar to those in Example 1.

Comparative Example 1

For comparison, experiments were carried out in the sammer manner as in Example 1, except that pellets of a

Comparative Example 2

The compositions comprising the rubber-modified polystyrene and styrene-butadiene block copolymer obtained in Referential Example and the compositions comprising the same rubber-modified polystyrene and a commerical general-purpose polystyrene (Esprite ®-4 of Nippon Polystyrene Industry Co.; molecular weight, 270,000) were compared with each other with respect to the surface gloss. The testing methods were the same as in Example 1. The results obtained were as shown in Table 5.

As is evident from Table 5, the present resin compositions showed superior surface gloss.

Table 5

| No. | Rubber-modified poly-styrene (%) | General-purpose poly-styrene (%) | Surface gloss (%) | No. | Rubber-modified poly-styrene (%) | Styrene-butadiene block copolymer resin(A) (%) | Surface gloss (%) | No. | Rubber-modified poly-styrene (%) | Styrene-butadiene block copolymer resin(B) (%) | Surface gloss (%) |
|---|---|---|---|---|---|---|---|---|---|---|---|
| 9  | 100 | 0  | 38 | 9 | 100 | 0  | 38 | 9  | 100 | 0  | 38 |
| 25 | 70  | 30 | 52 | 6 | 70  | 30 | 78 | 15 | 70  | 30 | 77 |
| 36 | 60  | 40 | 59 | 5 | 60  | 40 | 84 | 14 | 60  | 40 | 84 |
| 37 | 40  | 60 | 74 | 4 | 40  | 60 | 91 | 13 | 40  | 60 | 93 |
| 38 | 15  | 85 | 89 | 3 | 15  | 85 | 97 | 12 | 15  | 85 | 98 |

What is claimed is:

1. A resin composition consisting essentially of a rubber modified polystyrene which is obtained by mechanically mixing a rubbery substance selected from the group consisting of polybutadiene, and styrene-butadiene with polystyrene or by graft-copolymerizing styrene with said rubbery substance and
   a transparent styrene-butadiene block copolymer containing 65 to 95% by weight of styrene and 5 to 35% by weight of butadiene, wherein the ratio of said rubber-modified polystyrene to said styrene-butadiene block copolymer is in the range from 0.5 : 99.5 to 15 : 85 by weight.

2. A resin composition according to claim 1, wherein the structure of the styrene-butadiene block copolymer is
   1. $(S-B)_n$, $(S-B)_n-S$, or $B-(S-B)_n$,
   2. $[S-(S/B)]_n$, $[S-(S/B)]_n-S$, or $(S-B)-[S-(S/B)]_n$,
   3. $[(B \rightarrow S)]_n-S$, $S-[(B \rightarrow S)]_n$, $S-[(B \rightarrow S)]_n-S$, or $S-[(S \leftarrow B \rightarrow S)]_n-S$, or
   4. $S-[(S/B) \rightarrow (S/B)]-S$, or $S-[(S/B) \leftarrow (S/B) \rightarrow (S/B)]-S$ wherein S represents a block chain composed of polymerized styrene, B represents an elastomeric block chain composed of polymerized butadiene, (S/B) represents an elastomeric block chain comprising copolymerized styrene and butadiene, in which chain styrene and butadiene are bound to each other in a fixed ratio [the ratio of S to B in (S/B) can be any of the ratios including the case where S is absent], $(B \rightarrow S)$ or $(S \leftarrow B \rightarrow S)$ represents an elastomeric block chain comprising copolymerized styrene and butadiene, in which chain in the direction denoted by an arrow butadiene content gradually decreases while styrene content increases, $[(S/B) \rightarrow (S/B)]$ or $[(S/B) \leftarrow (S/B) \rightarrow (S/B)]$ represents an elastomeric block chain comprising a styrene-butadiene copolymer chain in which styrene and butadiene are bound in a random ratio and the ratio vaires within the chain intermittently or continuously, and n is an integer of 1 to 3.

3. A resin composition according to claim 2, wherein the elastomeric block chain in the styrene-butadiene block copolymer is a polymeric chain comprising styrene-butadiene copolymer chain.

4. A resin composition according to claim 1, which is incorporated with a stabilizer, colorant, and lubricant.

* * * * *